United States Patent
Burgermeister

(10) Patent No.: US 10,924,033 B2
(45) Date of Patent: *Feb. 16, 2021

(54) METHOD OF OPERATING AN INVERTER FOR EMITTER SHUNT CURRENT MEASUREMENT AND INVERTER

(71) Applicant: Schmidhauser AG, Romanshorn (CH)

(72) Inventor: Andreas Burgermeister, Mauren (CH)

(73) Assignee: Schmidhauser AG, Romanshorn (CH)

(*) Notice: Subject to any disclaimer, the term of this patent is extended or adjusted under 35 U.S.C. 154(b) by 0 days.

This patent is subject to a terminal disclaimer.

(21) Appl. No.: 16/451,900

(22) Filed: Jun. 25, 2019

(65) Prior Publication Data
US 2019/0393804 A1  Dec. 26, 2019

(30) Foreign Application Priority Data
Jun. 26, 2018 (DE) .............. 10 2018 210 391.7

(51) Int. Cl.
*H02M 7/5387* (2007.01)

(52) U.S. Cl.
CPC ................ *H02M 7/5387* (2013.01)

(58) Field of Classification Search
CPC ...... H02M 7/483; H02M 7/521; H02M 7/527; H02M 7/529; H02M 2001/0009; H02M 7/487
See application file for complete search history.

(56) References Cited

U.S. PATENT DOCUMENTS

| 8,816,612 B2 | 8/2014 | Suzuki | |
| 2013/0264974 A1* | 10/2013 | Suzuki | H02P 27/08 318/139 |
| 2014/0056038 A1* | 2/2014 | Yamamoto | H02M 5/297 363/36 |

OTHER PUBLICATIONS

N. S. Preda, I. I. Incze, M. Imecs and C. Szabo, "Flat-Top space-vector modulation implemented on a fixed-point DSP," 2009 5th International Symposium on Applied Computational Intelligence and Informatics, Timisoara, 2009, pp. 153-158. (Year: 2009).*

* cited by examiner

*Primary Examiner* — Peter M Novak
(74) *Attorney, Agent, or Firm* — Crowell & Moring LLP

(57) ABSTRACT

A method operates an inverter by driving respective switching means of the bridge arms using pulse width modulation with a temporally changeable duty cycle such that voltages between the bridge connections have a temporally predefined profile. The respective switching means of the bridge arms are driven with flat-top modulation for particular angular ranges of a respective fundamental oscillation. A respective duty cycle for the respective switching means of the bridge arms is selected such that, during a respective period of the pulse width modulation, at least two shunt resistors always perform their measurement function for a minimum time.

8 Claims, 2 Drawing Sheets

METHOD OF OPERATING AN INVERTER FOR EMITTER SHUNT CURRENT MEASUREMENT AND INVERTER

BACKGROUND AND SUMMARY OF THE INVENTION

The invention relates to a method for operating an inverter, and to an inverter.

The invention is based on the object of providing a method for operating an inverter and an inverter that allows reliable emitter shunt current measurement, combined with low electrical switching losses.

The invention achieves this objective by a method according to the claimed invention and an inverter according to the claimed invention.

The method according to the invention is used to operate an inverter. An inverter within the meaning of the invention is an electrical device that converts DC voltage into AC voltage or DC current into AC current. Reference is also made in this respect to the relevant literature in the field. The inverter may be part of a frequency converter.

The inverter has a number of bridge arms, for example three bridge arms.

The bridge arms conventionally have respective bridge connections to which a three-phase current motor is able to be connected.

A respective bridge arm is conventionally electrically connected to a first intermediate circuit pole of the inverter on a first side and electrically connected to a second intermediate circuit pole of the inverter on a second side. A positive intermediate circuit potential may be present at the first intermediate circuit pole during operation and a negative intermediate circuit potential may be present at the second intermediate circuit pole during operation. A difference between the positive and the negative intermediate circuit potential may form an intermediate circuit voltage.

A respective bridge arm has at least two driveable (semi-conductor) switching means, for example in the form of IGBTs (insulated-gate bipolar transistors).

A respective bridge connection of the bridge arms is electrically connected, depending on a switching state of the switching means of the bridge arm, either to the first intermediate circuit pole or to the second intermediate circuit pole. If two switching means are provided within a respective bridge arm, one of the two switching means is typically always in the on state, and the other is in the off state.

A current measurement means, for example in the form of a shunt resistor, is conventionally provided in a respective bridge arm, which current measurement means or shunt resistor performs (is able to perform) or does not perform a measurement function depending on a switching state of the switching means. The shunt resistor may allow for example a conventional emitter shunt current measurement. The shunt resistor is typically connected between a respective bridge connection of a bridge arm and the second intermediate circuit pole.

The switching state of the switching means that performs or allows the measurement function is typically that switching state in which the upper switching means (the switching means electrically connected to the first intermediate circuit pole) of the bridge arm is open and the lower switching means (the switching means electrically connected to the second intermediate circuit pole) of the bridge arm is closed, such that a current to be measured is able to flow through the shunt resistor.

The method according to the invention comprises the steps outlined below.

The respective switching means of the bridge arms are driven using pulse width modulation with a temporally changeable duty cycle such that voltages between the bridge connections have a temporally predefined profile, for example an approximately sinusoidal profile.

A value of the duty cycle defines or indicates the ratio of the pulse duration to the period duration, here the pulse width modulation, for a periodic sequence of pulses. The duty cycle is indicated as a numerical ratio having a range of values from 0 to 1 or 0 to 100%. The duty cycles To of upper switching means (these switching means connect the bridge connection to the first intermediate circuit pole) and the duty cycles Tu of lower switching means (these switching means connect the bridge connection to the second intermediate circuit pole) are related to one another such that To+Tu=1, since only one of the switching means of the bridge arms is ever in the on state. A value of the duty cycle of 100% for the lower switching means may mean for example that the lower switching means is continuously on (measurement is possible), the duty cycle of the upper switching means having to be 0% for this case, that is to say the upper switching means is continuously off. Accordingly, a value of the duty cycle of 0% for the lower switching means may mean that the lower switching means is continuously off (measurement is impossible), the duty cycle of the upper switching means having to be 100% for this case, that is to say the upper switching means is continuously on. An exemplary value of the duty cycle of 20% for the lower switching means ultimately means that the lower switching means is on for 20% of the period duration (measurement is typically possible), the duty cycle of the upper switching means having to be 80% for this case, that is to say the upper switching means is on for 80% of the period duration. For the rest, reference is also made to the relevant literature in the field.

The respective switching means of the bridge arms are driven with flat-top modulation for particular angular ranges of a respective fundamental oscillation.

A fundamental oscillation extends for example over an entire period (360° angular extent) of a sinusoidal voltage between two bridge connections, this being generated by way of suitable driving of the inverter.

The purpose of a flat-top modulation is to reduce inverter switching losses. In a flat-top modulation, the switching state of the switching means of one of the bridge arms is kept constant for a predefined angular range of the fundamental oscillation, that is to say, for example in the case of two switching means per bridge arm, one of the switching means is continuously switched on and the other is continuously switched off. Pulse width modulation then takes place only in the other bridge arms. The predefined angular range may be for example 60°, so that precisely one bridge arm does not switch over the entire fundamental oscillation, and therefore does not cause any switching losses. This reduces the switching losses by around 30%.

According to the invention, by way of example, six angular ranges of a respective fundamental oscillation may be predefined for the flat-top modulation. The angular ranges may have an identical or different size. A sum of all of the angular ranges may amount to 360° or less than 360°. The angular ranges may for example have a size of between 20° and 60°.

According to the invention, a respective duty cycle for the switching means of the bridge arms over a respective fundamental oscillation is selected such that, during a respective period of the pulse width modulation, at least two shunt resistors are always able to perform their measurement function for a minimum time, for example by switching to the lower switching means of a bridge arm earlier if a particular duty cycle that would make a measurement impossible is undershot, so that the shunt resistor of said bridge arm is flowed through by current for the minimum time per period. In this case, use is made of the property whereby the same voltage is able to be generated between two bridge connections by way of different potentials at the two bridge connections, just as long as the potential difference remains identical.

According to one embodiment, the minimum time is greater than 2 µs, preferably greater than 5 µs, preferably greater than 8 µs, preferably greater than 10 µs.

According to one embodiment, a respective duty cycle for those switching means of the bridge arms that electrically connect the respective bridge connection to the second intermediate circuit pole is selected such that, at the same time, at least two duty cycles are always greater than a threshold value, such that the minimum time to obtain the measurement function of the shunt resistors is met. The threshold value depends on a switching frequency or the period duration of the pulse width modulation. By way of example, in the case of a switching frequency of the pulse width modulation of 8 kHz, the threshold value may be 4%, resulting in a minimum time of 5 µs. As an alternative, in the case of a switching frequency of the pulse width modulation of 8 kHz, the threshold value may be 8%, resulting in a minimum time of 10 µs.

According to one embodiment, the following holds true for a control angle $\alpha$ of the pulse width-modulated driving: $-30° \leq \alpha \leq 30°$ and $\alpha \neq 0°$.

The inverter according to the invention has: a number of bridge arms having respective bridge connections, wherein a respective bridge arm is electrically connected to a first intermediate circuit pole of the inverter on a first side and wherein a respective bridge arm is electrically connected to a second intermediate circuit pole of the inverter on a second side. A respective bridge arm has at least two switching means, wherein a respective bridge connection is electrically connected, depending on a switching state of the switching means of the bridge arm, without or with the intermediate connection of further components, either to the first intermediate circuit pole or to the second intermediate circuit pole. A current measurement means, for example in the form of a shunt resistor, is arranged in a respective bridge arm, which current measurement means or shunt resistor performs or does not perform a measurement function depending on a switching state of the switching means. The inverter furthermore has a control unit, for example in the form of a microcontroller, which control unit or microcontroller is designed to drive the switching means such that a method as described above is executed.

BRIEF DESCRIPTION OF THE DRAWINGS

The invention is described in detail below with reference to the drawings, in which.

DETAILED DESCRIPTION OF THE DRAWINGS

Figure 1:
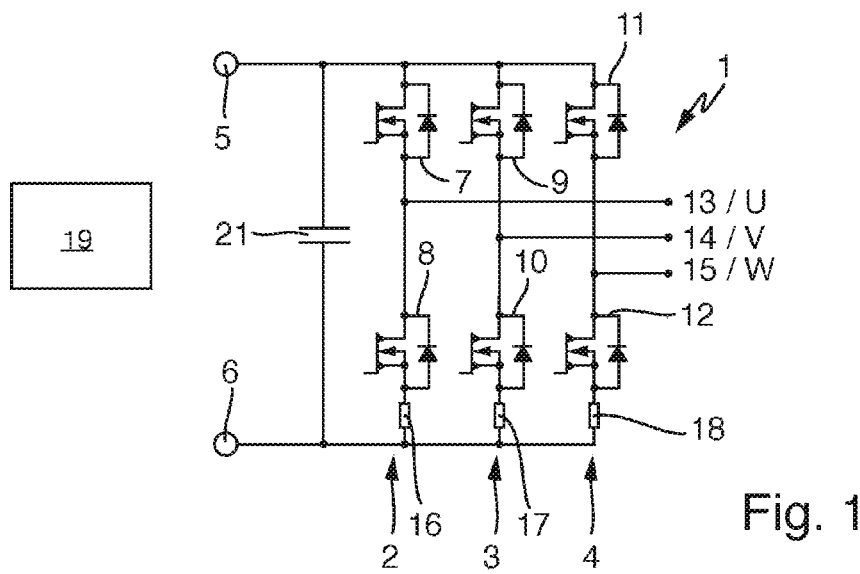
FIG. 1 shows a schematic circuit diagram of an inverter according to the invention.

FIG. 1 shows an inverter 1 having three bridge arms 2, 3, 4 with respective bridge connections 13, 14 and respectively 15. A three-phase current motor may be connected to the bridge connections 13, 14 and 15, for example. The bridge connections 13, 14 and 15 may correspond for example to phase potentials U, V and W, respectively, as illustrated.

A respective bridge arm 2, 3, 4 is electrically connected to a first intermediate circuit pole 5 of the inverter 1 on an upper side and electrically connected to a second intermediate circuit pole 6 of the inverter 1 on a lower side. A positive intermediate circuit potential is present at the first intermediate circuit pole 5 and a negative intermediate circuit potential is present at the second intermediate circuit pole 6, a potential difference between these potentials forming an intermediate circuit voltage that is buffered by way of an intermediate circuit capacitor 21.

The first bridge arm 2 has two series-connected semiconductor switching means 7 and 8 and a shunt resistor 16 connected between the semiconductor switching means 8 and the second intermediate circuit pole 6. The first semiconductor switching means 7, the second semiconductor switching means 8 and the shunt resistor are connected in series between the first intermediate circuit pole 5 and the second intermediate circuit pole 6. The bridge connection 13 is formed by a connecting point between the semiconductor switching means 7 and 8 and is therefore electrically connected to the first intermediate circuit pole 5 when the first semiconductor switching means 7 is in the on state and the second semiconductor switching means 8 is in the off state. Accordingly, the bridge connection 13 is electrically connected to the second intermediate circuit pole 6 via the shunt resistor 16 when the second semiconductor switching means 8 is in the on state and the first semiconductor switching means 7 is in the off state.

The second bridge arm 3 accordingly has two series-connected semiconductor switching means 9 and 10 and a shunt resistor 17 connected between the second semiconductor switching means 10 and the second intermediate circuit pole 6. The first semiconductor switching means 9, the second semiconductor switching means 10 and the shunt resistor 17 are connected in series between the first intermediate circuit pole 5 and the second intermediate circuit pole 6. The bridge connection 14 is formed by a connecting point between the semiconductor switching means 9 and 10 and is therefore electrically connected to the first intermediate circuit pole 5 when the first semiconductor switching means 9 is in the on state and the second semiconductor switching means 10 is in the off state. Accordingly, the bridge connection 14 is electrically connected to the second intermediate circuit pole 6 via the shunt resistor 17 when the second semiconductor switching means 10 is in the on state and the first semiconductor switching means 9 is in the off state.

The third bridge arm 4 accordingly has two series-connected semiconductor switching means 11 and 12 and a shunt resistor 18 connected between the second semiconductor switching means 12 and the second intermediate circuit pole 6. The first semiconductor switching means 11, the second semiconductor switching means 12 and the shunt resistor 18 are connected in series between the first intermediate circuit pole 5 and the second intermediate circuit pole 6. The bridge connection 15 is formed by a connecting point between the semiconductor switching means 11 and 12 and is therefore electrically connected to the first intermediate circuit pole 5 when the first semiconductor switching means 11 is in the on state and the second semiconductor switching means 12 is in the off state. Accordingly, the bridge connection 15 is electrically connected to the second intermediate circuit pole 6 via the shunt resistor 18 when the second semiconductor switching means 12 is in the on state and the first semiconductor switching means 11 is in the off state.

The shunt resistors 16, 17, 18 perform their measurement function (only) when the lower switching means 8, 10 and 12, respectively, are closed for a minimum time and the upper switching means 7, 9 and 11, respectively, are accordingly open.

The method according to the invention is described in detail below with reference to FIGS. 2 to 4.

Figure 2:
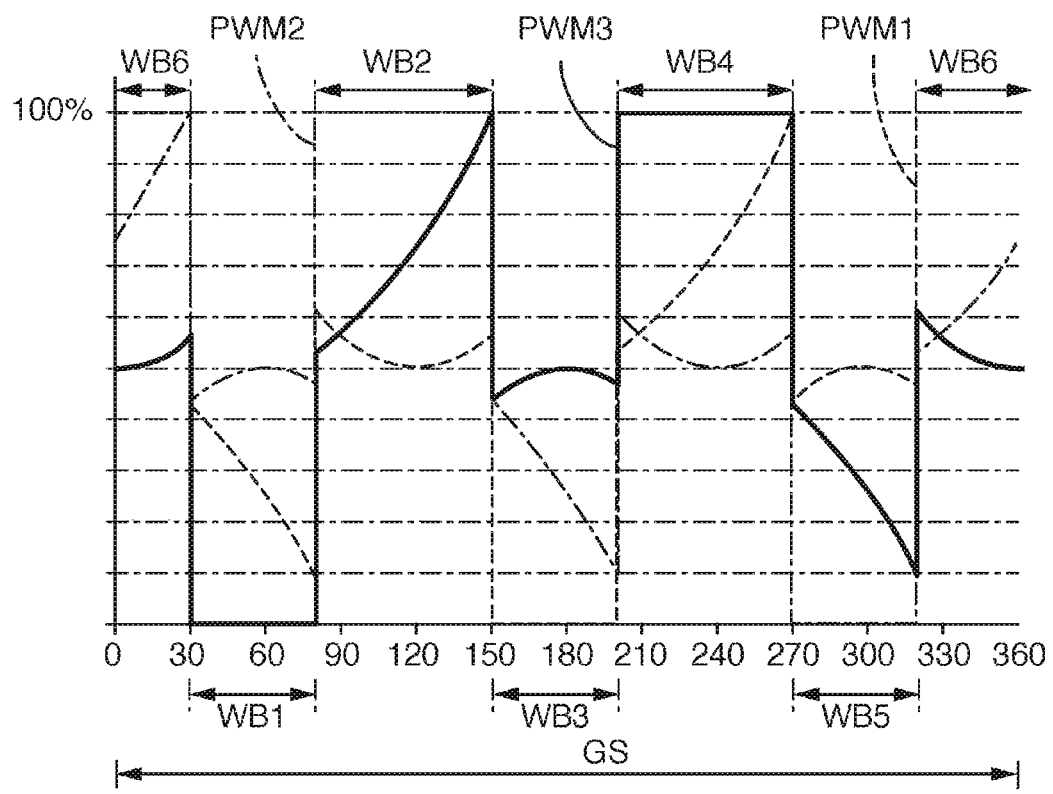
FIG. 2 shows angle-dependent profiles of duty cycles of switching means of the inverter illustrated in FIG. 1.
Figure 3:
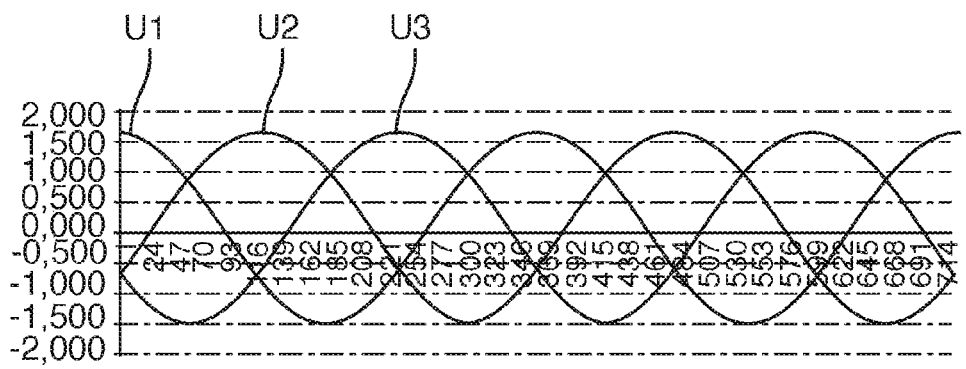
FIG. 3 shows angle-dependent profiles of voltages between bridge connections of the inverter illustrated in FIG. 1.
Figure 4:
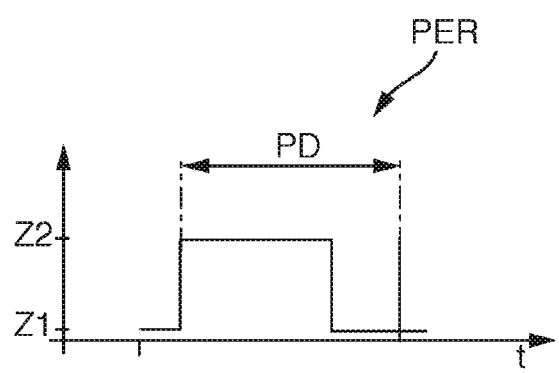
FIG. 4 shows, by way of example, a pulse width-modulated driving signal of a switching means of the inverter illustrated in FIG. 1.

With reference to FIGS. 2 to 4, the lower switching means 8, 10 and 12 of the bridge arms 2, 3 and 4, respectively, are driven using pulse width modulation with a temporally changeable duty cycle PWM1, PWM2 and PWM3, respectively, such that voltages U1, U2 and U3, respectively, between the bridge connections 13, 14, 15 have a temporally predefined, approximately sinusoidal profile. The voltage U1 corresponds to a potential difference between the bridge connections 14 and 15 or V and W, the voltage U2 corresponds to a potential difference between the bridge connections 13 and 14 or U and V, and the voltage U3 corresponds to a potential difference between the bridge connections 15 and 13 or W and U.

The lower switching means 8 of the bridge arm 2 is driven with the duty cycle PWM1, the lower switching means 10 of the bridge arm 3 is driven with the duty cycle PWM2, and the lower switching means 12 of the bridge arm 4 is driven with the duty cycle PWM3. The profile of the duty cycles for the upper switching means 7, 9 and 11, respectively, results as (1−PWM1), (1−PWM2) and (1−PWM3), respectively.

With reference to FIG. 4, a value of a respective duty cycle PWM1, PWM2 and PWM3, respectively, indicates to which portion, with respect to a period PER of the pulse width modulation with the period duration PD, a lower switching means 8, 10 and 12, respectively, is connected. A duty cycle of 100% indicates that the lower switching means 8, 10 and respectively 12 is continuously switched on during a period PER. A duty cycle of 0% indicates that the lower switching means 8, 10 and 12, respectively, is continuously switched off during a period PER.

With continuing reference to FIG. 2, the respective switching means 7, 8; 9, 10; 11, 12 of the bridge arms 2, 3 and 4, respectively, are driven with flat-top modulation for particular angular ranges WB1, WB2, WB3, WB4, WB5, WB6 of a respective fundamental oscillation GS.

Thus, in the angular range WB1, the lower switching means 12 of the bridge arm 4 is continuously off and the upper switching means 11 of the switch arm 4 is continuously on. A change in switching state of the switching means takes place only in bridge arms 2 and 3.

In the angular range WB2, the lower switching means 8 of the bridge arm 2 is continuously on and the upper switching means 7 of the bridge arm 2 is continuously off. A change in switching state of the switching means takes place only in bridge arms 3 and 4.

The same applies to the angular ranges WB3 to WB6.

As illustrated in FIG. 2, a respective duty cycle PWM1, PWM2, PWM3 for the respective switching means 8, 10 and 12 of the bridge arms 2, 3 and 4, respectively, is selected such that, at the same time, at least two duty cycles are always greater than 8%. This has the effect that at least two of the shunt resistors 16, 17, 18 are always able to perform their measurement function for a minimum time of 10 μs within a period of the pulse width modulation.

With reference to FIG. 4, a control angle α of the pulse width-modulated driving is 30°.

The invention allows power loss-optimized driving of an electric motor in connection with an improved emitter current measurement. To reduce the inverter switching losses, flat-top modulation is applied instead of sine-weighted modulation. In this case, for the predefined angular ranges, a switching means or end-stage switch of a bridge arm is constantly switched on, and the inverse is switched off (blocking operation). Only the switching means of the remaining bridge arms are driven using pulse width modulation. This considerably reduces the switching losses.

The flat-top modulation is performed in a current vector-optimized manner, that is to say the blockwise switching on of a switching means is phase-shifted by 30°. Due to the fact that the chained motor voltage then reaches the maximum value in the region of non-pulsed operation, the maximum current is also present here (at cos phi=1).

A potential problem here is the measurement of the motor currents by way of an emitter shunt current measurement. Since two upper switching means are switched on at the same time in certain angular ranges, a reliable current measurement would not be possible. Depending on the switching frequency, around 8% duty cycle is necessary in order to ensure a sufficiently long switch-on time of the lower IGBT (for example 10 μs at 8 kHz PWM).

Immediately before two duty cycles undershoot the threshold of for example 8% duty cycle at the same time, early switching is performed to the blocking operation of the lower switching means by way of one of the bridge arms, such that a situation whereby two duty cycles undershoot the threshold of for example 8% duty cycle at the same time is avoided. It is thereby always ensured that two current measurements deliver a correct value. The third current value may be calculated using a sum current formula.

The current measurement values of the shunt resistors of the bridge arms having the two highest duty cycles are used to measure the current.

It is furthermore advantageous in the method according to the invention that, before switching into the respective next block, all three lower switching means are always active (>>8%). A sample and hold capacitor of a current sensor system is thus already charged in good time. There are no corners in the current measurement signal.

By way of example, the following advantages are able to be achieved by way of the invention in comparison with a conventional sine modulation: a cost saving (smaller heat sinks, IGBT), smaller structural size of the inverters or frequency converters that comprise such inverters, lower power loss in the frequency converter, and lower bearing currents in the motor.

By way of example, the following advantages are able to be achieved by way of the invention in comparison with a conventional flat-top modulation: better current measurement quality, and lower power loss since there is blocking operation at maximum current.

In comparison with a conventional current vector-oriented flat-top modulation, it is possible to achieve an improved current measurement quality.

What is claimed is:

1. A method for operating an inverter, wherein the inverter comprises:
    a number of bridge arms having respective bridge connections,
    wherein a respective bridge arm is electrically connected to a first intermediate circuit pole of the inverter on a first side and wherein a respective bridge arm is electrically connected to a second intermediate circuit pole of the inverter on a second side,
    wherein the respective bridge arm has at least two switching means, wherein a respective bridge connection electrically connects depending on a switching state of the switching means of the bridge arm, either to the first intermediate circuit pole or to the second intermediate circuit pole, and
    wherein a shunt resistor is arranged in the respective bridge arm, and the shunt resistor performs or does not perform a measurement function depending on a switching state of the switching means,
    wherein the method comprises the steps of:
    driving the respective switching means of the respective bridge arms using pulse width modulation with a temporally changeable duty cycle such that voltages between the bridge connections have a temporally predefined profile,
    wherein the respective switching means of the respective bridge arms are driven with flat-top modulation for particular angular ranges of a respective fundamental oscillation,
    wherein a respective duty cycle for the respective switching means of the respective bridge arms is selected such that, during a respective period of the pulse width modulation, at least two shunt resistors always perform their measurement function for a minimum time, and
    wherein before two duty cycles for the respective switching means of the respective bridge arms undershoot a given threshold at a same time, switching is performed to a blocking operation of a lower switching means of one of the respective bridge arms.

2. The method according to claim 1, wherein the minimum time is greater than 5 µs.

3. The method according to claim 2, wherein the respective duty cycle for those switching means of the bridge arms that electrically connect the respective bridge connection to the second intermediate circuit pole is selected such that, at the same time, at least two duty cycles are always greater than a threshold value.

4. The method according to claim 1, wherein a control angle $\alpha$ of the pulse width-modulated driving satisfies the following: $-30° \leq \alpha \leq 30°$ and $\alpha \neq 0°$.

5. An inverter, comprising:
    a number of bridge arms having respective bridge connections, wherein
        a respective bridge arm is electrically connected to a first intermediate circuit pole of the inverter on a first side and wherein a respective bridge arm is electrically connected to a second intermediate circuit pole of the inverter on a second side,
        the respective bridge arm has at least two switching means, wherein a respective bridge connection electrically connects depending on a switching state of the switching means of the bridge arm, either to the first intermediate circuit pole or to the second intermediate circuit pole, and
        a shunt resistor is arranged in the respective bridge arm, and the shunt resistor performs or does not perform a measurement function depending on a switching state of the switching means; and
    a control unit that is configured to:
    drive the respective switching means of the respective bridge arms using pulse width modulation with a temporally changeable duty cycle such that voltages between the bridge connections have a temporally predefined profile,
    wherein the respective switching means of the respective bridge arms are driven with flat-top modulation for particular angular ranges of a respective fundamental oscillation,
    wherein a respective duty cycle for the respective switching means of the respective bridge arms is selected such that, during a respective period of the pulse width modulation, at least two shunt resistors always perform their measurement function for a minimum time, and
    wherein before two duty cycles for the respective switching means of the respective bridge arms undershoot a given threshold at a same time, switching is performed to a blocking operation of a lower switching means of one of the respective bridge arms.

6. The inverter according to claim 5, wherein the minimum time is greater than 5 µs.

7. The inverter according to claim 6, wherein the respective duty cycle for those switching means of the bridge arms that electrically connect the respective bridge connection to the second intermediate circuit pole is selected such that, at the same time, at least two duty cycles are always greater than a threshold value.

8. The inverter according to claim 5, wherein a control angle $\alpha$ of the pulse width-modulated driving satisfies the following: $-30° \leq \alpha \leq 30°$ and $\alpha \neq 0°$.

* * * * *